United States Patent [19]

Irwin

[11] 4,232,143
[45] Nov. 4, 1980

[54] POLYESTER WHICH EXHIBITS ANISOTROPY IN THE MELT CONTAINING p-OXYBENZOYL UNITS AND 4,4'-DIOXYBENZOPHENONE UNITS OR METHYL AND CHLORO DERIVATIVES THEREOF

[75] Inventor: Robert S. Irwin, Wilmington, Del.

[73] Assignee: E. I. Du Pont de Nemours and Company, Wilmington, Del.

[21] Appl. No.: 76,800

[22] Filed: Sep. 17, 1979

[51] Int. Cl.$^3$ .............................................. C08G 63/60
[52] U.S. Cl. .................................... 528/128; 528/125; 528/191; 528/193
[58] Field of Search ................ 528/125, 128, 191, 193

[56] References Cited

U.S. PATENT DOCUMENTS

| | | | |
|---|---|---|---|
| 2,464,207 | 3/1949 | Bender et al. | 260/613 |
| 3,028,364 | 4/1962 | Conix et al. | 528/128 |
| 3,518,175 | 6/1970 | Bell | 528/128 |
| 3,531,435 | 9/1970 | Wear et al. | 528/125 |
| 4,130,545 | 12/1978 | Calundann | 528/193 |

*Primary Examiner*—Lester L. Lee

[57] ABSTRACT

An aromatic polyester consisting essentially of p-oxybenzoyl units or the 3-methyl or 3-chloro-derivatives thereof, 4,4'-dioxybenzophenone units or the 3-methyl- or 3-chloro- derivatives thereof, terephthaloyl units and optionally 1,4-dioxyphenylene units.

15 Claims, No Drawings

POLYESTER WHICH EXHIBITS ANISOTROPY IN THE MELT CONTAINING P-OXYBENZOYL UNITS AND 4,4'-DIOXYBENZOPHENONE UNITS OR METHYL AND CHLORO DERIVATIVES THEREOF

BACKGROUND OF THE INVENTION

1. Field of the Invention

This invention relates to fiber-forming melt-spinnable aromatic polyesters and to filaments thereof having high tenacity and high modulus.

2. Description of the Prior Art

A class of aromatic polyesters that form optically anisotropic melts from which oriented filaments can be melt spun has been described in Schaefgen et al. U.S. Pat. No. 4,118,372. Most polyesters which are disclosed in this patent are derived primarily from para-oriented dihydric phenols and para-oriented dicarboxylic acids. Filaments that are melt-spun from such polyesters can be heat treated to high tenacity and modulus. Other polyesters are disclosed in the aforementioned Schaefgen et al. patent which are copolymers derived from p-hydroxybenzoic acid, dihydric phenols and dicarboxylic acids.

Recent U.S. Pat. Nos. 4,067,852; 4,083,829; and 4,130,545 disclose polyesters consisting essentially of p-oxybenzoyl moieties, 2,6-dicarboxynaphthalene moieties and various other moieties. U.S. Pat. No. 4,130,545 refers to an application Ser. No. 832,147 which claims an aromatic polyester consisting essentially of p-oxybenzoyl moiety, 2,6-dioxynaphthalene moiety and terephthaloyl moiety. Applicant has found new polyesters that may be melt spun into filaments which upon heat treatment exhibit high tenacity and high modulus.

SUMMARY OF THE INVENTION

The present invention is directed to fiber-forming copolyesters that exhibit optical anisotropy in the melt and consist essentially of units I, II, III and IV having the structural formulas:

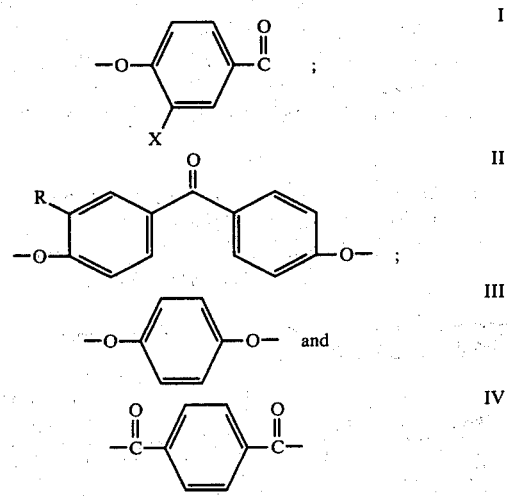

where X and R are independently hydrogen, methyl- or chloro-, with the proviso that when X is methyl-, R is hydrogen or methyl-, and when X is chloro-, R is hydrogen or chloro-, in the proportions of about 54–70 mol % of Unit I, about 10–16 mol % of Unit II, from 0 to about 8 mol % of Unit III and with Unit IV in an amount equivalent on a molar basis to Units II and III. Melt-spun and heat strengthened filaments of such polyesters are also contemplated.

DETAILED DESCRIPTION OF THE INVENTION

The copolyesters of the invention consist essentially of units as described above. Unit I (p-oxybenzoyl) is derived from p-hydroxybenzoic acid, or the 3-methyl or 3-chloro- derivative thereof. Unit IV (terephthaloyl) is derived from terephthalic acid. Unit III (1,4-dioxyphenylene) is derived from hydroquinone. Unit II (4,4'-dioxybenzophenone) is derived from 4,4'-hydroxybenzophenone or the 3-methyl or 3-chloro- derivative thereof. In place of such compounds one may usefully employ functional equivalents thereof as the reactants for preparing the copolyesters. The p-hydroxybenzoic acid reactant should be used in the form of an ester.

The reactants are generally combined in proportions corresponding to the molar proportions of the units desired in the copolyester products. The p-hydroxybenzoic acid reactant or methyl- or chloro-derivative thereof needed for Unit I should be reacted in an amount sufficient to supply from about 54 to 70 mol %, preferably about 60 mol %, of such units. When the upper or lower ends of the range are exceeded, there is a tendency towards polymer inhomogeneity. The reactant used to provide Unit II should be reacted in an amount sufficient to supply about 10 to 16 mol % of such units. The hydroquinone reactant should be used in an amount to provide from 0 to about 8 mol % of Unit III. A quantity of terephthalic acid reactant should be used to provide an amount of Unit IV equivalent to that of Units II and III. It will be apparent that in the polyester product there will be equimolar quantities of units derived from diphenolic and dicarboxylic acid reactants respectively.

Conventional polymerization techniques may be employed such as described in the aforementioned U.S. Pat. No. 4,118,372 and more particularly in the examples described below. In general, a mixture of monomers (preferably with diphenols in the form of their diacetates in up to 5% excess) are heated with stirring, under nitrogen, in a 250 ml 3-necked flask in a Wood's metal bath from approximately 250° C. to 330°–380° C. Polymerization is continued for up to a total of 0.5 to one hour until a fiber-forming molecular weight is reached but prior to excessive melt viscosity. Usually a vacuum is applied to obtain the final viscosity. The copolyesters of the invention exhibit optical anisotropy as determined by the thermooptical test (TOT) described in U.S. Pat. No. 4,118,372.

FILAMENT PREPARATION

The (co)polyesters may be spun into filaments by conventional melt-spinning techniques. In the examples, the filaments were prepared by melt-spinning into a quenching atmosphere of air or nitrogen and collected at the windup speed specified. The spinneret employed had either 1 or 10 capillaries, each shaped as a right circular cylinder 0.23 mm in diameter and 0.46 mm long. "Melt temperature" is the temperature at which the melt was maintained (values in parentheses are temperatures of the spinnerets).

As used herein, the term "as-spun fiber" refers to a fiber which has not been drawn or heat treated after extrusion and normal windup.

HEAT TREATMENT AND UTILITY

Following collection, samples of undrawn (as-spun) filament (or yarn) were heat-treated relaxed in an oven. Heating was in stages in a nitrogen atmosphere. Typically, temperature was raised to 200° C. in 2 hours, then to 304° C. in another 7 hours, and finally maintained at 304° C. for an additional 7 hours. Such a heating sequence is abbreviated as RT-200° C./2 hr + 200°–304° C./7 hr + 304° C./7 hr.

The heat-treated fibers of this invention are useful for a variety of industrial applications such as plastic and rubber reinforcement.

Inherent viscosity ($\eta_{inh}$) was computed from $$\eta\ inh = \ln\ (\eta_{rel})/C$$

where $\eta_{rel}$ is the relative viscosity and C is polymer concentration of 0.5 (i.e., 0.5 gm of polymer in 100 mL of solvent). Relative viscosity is the polymer solution to solvent ratio of flow times in a capillary viscometer at 25° C. The solvent employed was a mixture of 7.5% trifluoroacetic acid/17.5% methylene chloride/12.5% dichlorotetrafluoroacetone hydrate/12.5% perchloroethylene/50% 4-chlorophenol (all percentages by volume).

The copolyesters of this invention are anisotropic in the melt as determined using the thermooptical test (TOT) described in U.S. Pat. No. 4,118,372. Reported "flow temperatures" were obtained using this test. Alternatively (sometimes additionally) the polymers were characterized by "stick temperature" meaning the temperature of a thermal-gradient hot bar at the point at which the polymer first began to stick.

Filament tensile properties were measured using a recording stress-strain analyzer at 70° F. (21.1° C.) and 65% relative humidity. Sample lengths were 1.0 in (2.54 cm), and rate of elongation was 60%/min. Results are reported as D/T/E/M or T/E/M where D is linear density in tex units, T is break tenacity in dN/tex, E is elongation-at-break expressed as the percentage by which initial length increased, and M is initial tensile modulus in dN/tex. Since linear density is normally substantially unchanged by heat-treatment, it is reported only once.

Filaments of this invention have high heat-treated tenacities (e.g., about 10 dN/tex or greater) and high initial moduli (e.g., about 200 dN/tex or greater). Tensile properties reported in the examples are averages of 3 to 7 measurements (nearly always 5 or 6). There was sometimes considerable scatter among individual measurements caused in some instances by occasional contact between filaments in a near-plastic condition which resulted in light fusing and sporadic defects in the fibers which were reflected in their tensile properties. Thus, the maximum single tenacity value is also listed separately as the presumed best indication of property potential.

Preparation of Substituted and Unsubstituted 4,4'-Diacetoxybenzophenones 45.5 g (0.52 mole) of phenol, 69.0 g (0.50 mole) of 4-hydroxybenzoic acid, and 500 mL of hydrogen fluoride were heated together for 6 hr under autogenous pressure in an autoclave. Then the contents were mixed in excess water to precipitate a pink solid. Yield was 99 g (92.5%). The crude product was acetylated directly, without purification, by refluxing 2 hr in 3 times its volume of acetic anhydride and about 8 drops of sulfuric acid. Precipitation in excess water yielded 113 g of 4,4'-diacetoxybenzophenone of such high purity that no recrystallization was required (melting point 150–152° C.).

When 0.52 mole of o-cresol is used in the above preparation rather than the 0.52 mole of phenol, the acetylated product in high yield is 3-methyl-4,4'-diacetoxybenzophenone which, after recrystallization from ethanol, melts at 120°–121.5° C.

The other substituted 4,4'-diacetoxybenzophenone referred to herein is prepared by use of the correspondingly substituted phenol in place of o-cresol as just described.

EXAMPLES

The same general procedure was used in all the examples.

The monomer ingredients were added to a 3-necked flask in substantially the same molar ratios as desired in the final polymer except that an excess (usually 4 or 5%) of diacetates was used. The resultant polymer is identified, for example, as

HBA/MDHB/HQ/TPA (60/15/5/20)

meaning it was prepared from 60 mol % 4-acetoxybenzoic acid, 15 mole % 3-methyl-4,4'-diacetoxybenzophenone, 5 mole % hydroquinone diacetate, and 20 mol % terephthalic acid (excesses of diacetates are not included in these percentages).

The 3-necked flask was fitted with: (1) a glass stirrer extending through a pressure-tight resin bushing, (2) a nitrogen inlet, and (3) a short Vigreux column leading to a water-cooled condenser with a flask for collecting acetic acid by-product. An attachment for application of vacuum was provided at the end of the condenser. An electrically heated Wood's metal bath mounted for vertical adjustment was used for heating. The reaction mixture was heated to increasing temperatures with stirring at atmospheric pressure under nitrogen purge until essentially all the acetic acid had evolved. Then, under a vacuum of usually about 0.027 kPa, heating was continued until viscosity had increased to a level believed satisfactory for melt-spinning. The cooled and solidified polymer was comminuted, and a portion was molded into a cylindrical plug for press-polymer.

EXAMPLE I

Filaments From Polymers of 4-Acetoxybenzoic Acid (HBA), 3-Methyl-4,4'-Diacetoxybenzophenone (MDHB), Hydroquinone Diacetate (HQ), and Terephthalic Acid (TPA)

Polymerization Ingredients

| | | Grams Used | | | Mole Ratios HBA/MDHB/ |
|---|---|---|---|---|---|
| Run | HBA | MDHB | HQ | TPA | HQ/TPA |
| A | 21.6 | 9.73(4%)* | 2.02(4%)* | 6.64 | 60/15/5/20 |
| B | 21.6 | 8.19(5%) | 3.06(5%) | 6.64 | 60/12.5/7.5/20 |
| C | 21.6 | 6.49(4%) | 4.04(4%) | 6.64 | 60/10/10/20 |
| D | 54.0 | 24.34(4%) | 5.05(5%) | 16.60 | 60/15/5/20 |

*( ) indicates % excess

Polymerization Temperatures

| Run | Atmospheric Pressure | | Vacuum |
|---|---|---|---|
| A | 285°–346° C./41 min. | + | 346°–354° C./10 min. |
| B | 286°–340° C./23 min. | + | 340°–348° C./9 min. |
| C | 290°–362° C./43 min. | + | 362°–368° C./4 min. |

-continued

| Run | Inherent Viscosity | Flow Temp. (°C.) | Stick Temp. (°C.) |
|---|---|---|---|
| D | 271°–336° C./45 min. | + | 336°–341° C./11 min. |

Polymer Characterizations

| Run | Inherent Viscosity | Flow Temp. (°C.) | Stick Temp. (°C.) |
|---|---|---|---|
| A | 1.54 | — | 246 |
| B | 1.31 | 277 | 270 |
| C | 1.82 | 326 | 315 |
| D | 1.26 | — | 220 |

Filament Extrusion

| Run | Melt Temps. (°C.) Cell (spinneret) | Windup Speed (m/min) | No. of Holes |
|---|---|---|---|
| A | 340 (340) | 549 | 1 |
| B | 331 (342) | 549 | 1 |
| C | 339 (378) | 549 | 1 |
| D | 290 (310) | 457 | 10 |

Heat Treatment

Runs A, B, C, D were all heat treated as follows:
RT–200° C./2hr + 200–304° C./7 hr + 304° C./7 hr Tensile Properties

| Run | As-Spun D/T/E/M | Heat Treated T/E/M | Maximum T |
|---|---|---|---|
| A | 0.83/3.2/1.7/179 | 12.0/4.5/237 | 21.6 |
| B | 1.05/1.9/1.0/155 | 11.6/4.2/236 | 15.6 |
| C | 0.60/2.6/0.9/314 | 10.0/3.0/300 | 13.3 |
| D* | 0.58/2.7/2.3/109 | 12.8/6.6/190 | 14.2 |

*10-filament yarn actually tested.

Runs A and D were to the identical composition (60/15/5/20). Temperature cycles in polymerization varied somewhat, as did the resultant inherent viscosities (A being greater). It is important that polymerization be continued until a sufficiently high viscosity has been obtained to permit good spinning. In run A, a single filament was spun whereas, in Run D, a 10-filament yarn was spun. The heat-treated filament of Run A averaged a 3.75 -fold increase in tenacity over the as-spun filament and a very high maximum tenacity of 21.6 dN/tex. The polymer of Run D did spin well but had a low viscosity. In spite of that, however, a good maximum tenacity of 14.2 dN/tex resulted.

Run B illustrates the effect of altered polymer composition. Run B was at reduced MHBA level and correspondingly increased HQ level. It resulted in good tensile properties for heat-treated filaments. In some other runs, inhomogeneity in the melt and bubbles in the filaments were noted. For example at 50% HBA, the melt was so inhomogeneous that no spin was attempted.

In a separate run (not reported above) a spin very similar to Run C, but substituting resorcinol for the hydroquinone, was made. Polymerization and spinning proceeded excellently, but the heat-treated filament had unsatisfactory tenacity (7.7 average, 8.9 maximum) and extremely low modulus (45 average, 52 maximum).

EXAMPLE II

Filaments From Polymers of 4-Acetoxybenzoic Acid (HBA) 4,4'-diacetoxybenzophenone (DHB), Terephthalic Acid (TPA), and Hydroquinone Diacetate (HQ)

The ingredients, HBA-10.87 g, DHB-4.68 g (5% excess), TPA-3.32 g and HQ-1.01 g (5% excess) were combined for polymerization under the following conditions: 276°–354° C. for 25 min. at atmospheric pressure and 354°–350° C. for 5 min. under vacuum. The mole ratio of HBA/DHB/HQ/TPA was 60/15/20.

The resulting polymer had an inherent viscosity of 1.32 and a stick temperature of 290° C. A filament was melt spun from the polymer at a temperature of 330° C. The filament was heat treated at RT–200° C./2hr + 200°–304° C./7 hr + 304° C./7 hr.

Tensile Properties

| As-Spun D/T/E/M | Heat Treated T/E/M | Maximum T |
|---|---|---|
| 0.47/2.6/2.0/153 | 17.3/5.1/243 | 21.6 |

As can be seen from the above data, excellent tenacity and good modulus was obtained. Use of resorcinol diacetate in place of HQ resulted in drips at the spinneret and poor spinning performance.

EXAMPLE III

Filaments of Polymers of 3-Methyl-4-Acetoxybenzoic Acid (MHBA) or 3-Chloro-4-Acetoxybenzoic Acid (CHBA), 4,4'-Diacetoxybenzophenone (DHB), Hydroquinone Diacetate (HQ), and Terephthalic Acid (TPA)

Polymerization Ingredients

| Run | MHBA-(A) CHBA-(B) | DHB | HQ | T | Mole Ratios */DHB/HQ/T |
|---|---|---|---|---|---|
| A | 11.64 | 4.68(5%) | 1.01(5%) | 3.32 | 60/15/5/20 |
| B | 12.87 | 4.71(5%) | 1.03(5%) | 3.3 | 60/15/5/20 |

*See second column

Polymerization Temperature

| Run | Atmospheric Pressure | | Vacuum |
|---|---|---|---|
| A | 270°–342° C./30 min. | + | 342° C./1 min. |
| B | 270°–362° C./23 min. | + | 362° C./1 min. |

Polymerization Characterizations

| Run | Inherent Viscosity | Flow Temp. (°C.) | Stick Temp. (°C.) |
|---|---|---|---|
| A | 0.95 | — | 240 |
| B | Insol. | — | 290 |

Filament Extrusion

| Run | Melt Temp. (°C.) Cell (Spinneret) | Winding Speed (m/min) | No. of Holes |
|---|---|---|---|
| A | 300 (300) | 550 | 1 |
| B | 332 (333) | 550 | 1 |

Heat Treatment

| Run | Sequence |
|---|---|
| A-1 | RT–200° C./2 hr + 200°–304° C./7 hr + 304° C./7 hr |
| A-2 | 230° C./2 hr + 250° C./2 hr + 270° C./2 hr + 290° C./10 hr |
| B | 230° C./2 hr + 250° C./2 hr + 270° C./2 hr + 290° C./10 hr |

Tensile Properties

| Run | As-Spun D/T/E/M | Heat Treated T/E/M | Maximum T |
|---|---|---|---|
| A-1 | 0.80/2.1/1.2/202 | 10.4/6.4/169 | 15.3 |
| A-2 | 0.80/2.1/1.2/202 | 14.7/6.6/241 | 23.1 |
| B | 0.93/2.8/1.5/206 | 13.7/7.3/197 | 15.2 |

The two heat treatments of Run A illustrate the criticality of proper heat treating conditions. Treatment A-1 was apparently at a slightly too high maximum temperature, which additionally caused significant shrinkage. Runs A and B show that methyl or chloro substitution at the 3-position of the 4-hydroxybenzoic acid component, also results in excellent properties.

In runs similar to Run A except for variation in the mole ratios of ingredients, the 65/12.5/5/17.5 filament was slightly non-uniform in denier, yielded tenacities of 10.7 (max.) and 8.6 (avg.), and initial modulus of 233 (avg.). The 70/10/5/15 polymerization yielded a very inhomogeneous melt which degraded.

In a still further run identical to Run A except that 3,5-dimethyl-4-acetoxybenzoic acid replaced the 3-methyl-4-acetoxybenzoic acid, a very inhomogeneous melt which degrades was obtained.

EXAMPLE IV

Filaments From Polymer of HBA, 3-Chloro-4,4'-Diacetoxybenzophenone (CDHB), HQ and TPA The ingredients, HBA—10.8 g. CDHB—5.2 g (5% excess), HQ—1.01 g (5% excess) and TPA-3.32 g were combined for polymerization under the following conditions: 270–344° C. for 40 min. at atmospheric pressure and 344–360° C. for 7 min. under vacuum. The mole ratio of HBA/CDHB/HQ/TPA was 60/15/5/20.

The resulting polymer had an inherent viscosity of 1.64 and a stick temperature of 260° C. A filament was melt spun from the polymer at a temperature of 330° C. As-spun tensile properties were D/T/E/M—0.65/3.1/1.4/235. The filament was heat treated at RT—200° C./2 hr+200°—304° C./7 hr+304° C./7 hr. with resulting tensile properties T/E/M—13.3/3.8/301 and a maximum T of 17.6.

As can be seen from the above, excellent tensile properties were obtained. In substantially similar runs, the 3-methyl-4,4'-diacetoxybenzophenone was replaced on equal molar basis with 3,5-dimethyl-, 3,5-dichloro-, 3-ethyl-, 3-propyl-, 3-phenyl-, and 2,3,5,6-tetramethyl-4,4'-diacetoxybenzophenones. Where spinnable polymers were obtained, the resultant tensile properties were very low. The phenyl-substituted diacetoxybenzophenone was incompatible, and the polymer from the tetramethyl-substituted diacetoxybenzophenone melted only in excess of 400° C.

EXAMPLE V

Filaments From Polymer of MHBA, MDHB, HQ and TPA

MHBA/MDHB/HQ/TPA (60/15/5/20) was prepared using

| MHBA | 11.6 g |
| --- | --- |
| MDHB | 4.90 (5%) g |
| HQ | 1.01 (5%) g |
| TPA | 3.32 g |

Maximum polymerization temperature was 344° C. Inherent viscosity was 0.97, and the stick temperature was 240° C. A single filament was spun at 315° C. melt temperature (550 m/min) and it was heat treated by the sequence 230° C./2 hr+250° C./2 hr+270° C /2 hr+290° C./10 hr As-spun tensile properties were:

D/T/E/M =0.26/3.2/1.9/198

Heat-treated tensile properties were:

T/E/M=12.9/6.2/210 with maximum single T of 16.2

Appreciable shrinkage occurred during heat treatment.

This run was repeated except for a change in molar ratios (65/12.5/17.5 ). The resultant polymer formed an inhomogeneous melt which degraded, and no attempt to spin was made. This shows that some systems are particularly sensitive at the upper end of the range of permissible p-hydroxybenzoic acid reactant content.

Another run like this detailed example except for replacing MHBA with 3-chloro-4-acetoxybenzoic acid also produced an inhomogeneous melt which degraded. No spin was attempted. A still further run like the above except for also replacing the MDHB with CDHB resulted in a bubble-filled melt which was not tested further.

EXAMPLE VI

Filaments From Polymer of CHBA, CDHB, HQ and TPA (60/15/5/20)

| CHBA | 1.287 g |
| --- | --- |
| CDHB | 5.25 (5%) g |
| HQ | 1.03 (5%) g |
| TPA | 3.3 g |

The above ingredients were combined and polymerized by heating from 268° to 381° C. in 31 min. at atmospheric pressure followed by application of vacuum for 45 sec. at 381° C. The resultant polymer was insoluble in the solvent for determining inherent viscosity. Stick temperature was 220° C. A single filament was spun from a melt at 300°–310° C. with a winding speed of 549 m/min. Heat-treating cycles were—(1) RT-200° C./2 hr+200°-304° C./7 hr+304° C./7 hr, (2) RT-230° C./2 hr+250°C./2 hr+270° C./2 hr+290° C./10 hr Measured tensile properties were—

|  | As-Spun D/T/E/M | Heat-Treated T/E/M | Maximum T |
| --- | --- | --- | --- |
| (1) | 0.83/4.1/2.2/215 | 12.0/7.2/176 | 14.9 |
| (2) | (Same) | 14.1/6.0/243 | 17.8 |

EXAMPLE VII

Filaments From Polymers of 4-Acetoxybenzoic Acid (HBA), 3-Methyl-4,4'-Diacetoxybenzophenone (MDHB) and Terephthalic Acid (TPA)

Polymerization Ingredients

|  | Grams Used | | | Mole Ratios |
| --- | --- | --- | --- | --- |
| Run | HBA | MDHB | TPA | HBA/MDHB/TPA |
| A | 21.6 | 12.98 (4%) | 6.64 | 60/20/20 |
| B | 18.36 | 7.86 (5%) | 3.98 | 68/16/16 |

Polymerization Temperature

| Run | Atmospheric Pressure | Vacuum |
| --- | --- | --- |
| A | 285°-338° C./29 min | 338°-346° C./6 min |
| B | 288°-350° C./40 min | 350°-355° C./5 min |

Polymer Characterizations

| Run | Inherent Viscosity | Flow Temp. (°C.) | Stick Temp. (°C.) |
| --- | --- | --- | --- |
| A | 1.51 | 256 | 210 |
| B | 1.67 | — | 250 |

Filament Extrusion

| Run | Melt Temps (°C.) Cell (Spinneret) | Winding Speed (m/min) | No. of Holes |
| --- | --- | --- | --- |
| A | 321 (320) | 549 | 1 |
| B | 316 (317) | 549 | 1 |

Tensile Properties of Heat Treated Filament

| Run | As-Spun D/T/E/M | Heat Treated T/E/M | Maximum T |
| --- | --- | --- | --- |

| | -continued | | |
|---|---|---|---|
| A | 0.62/2.8/7.6/52 | 8.3/9.5/48 | 9.1 |
| B | 0.50/2.3/1.2/215 | 7.7/2.8/281 | 9.5 |

Run A, with 20 mol % MDHB, yielded unacceptably low modulus. Run B, with 16 mol % MDHB, yielded marginally acceptable tenacity but good modulus. These and other tests with both MDHB and DHB indicate that about 16 mol % of this benzophenone ingredient is the maximum which will yield satisfactory tensile properties.

I claim:

1. Fiber-forming copolyesters consisting essentially of units I, II, III and IV having the structural formulas:

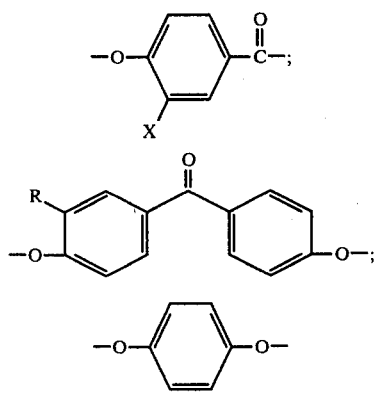

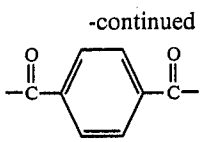

where X and R are independently hydrogen, methyl- or chloro-, with the proviso that when X is methyl-, R is hydrogen or methyl-, and when X is chloro-, R is hydrogen or chloro-, in the proportions of about 54–70 mol % of Unit I, about 10–16 mol % of Unit II, from 0 to about 8 mol % of Unit III and an amount of Unit IV equivalent on a molar basis to Units II and III.

2. A filament of a copolyester of claim 1.
3. A fiber-forming copolyester according to claim 1 wherein Unit I is present in an amount of about 60 mol %.
4. A filament of a copolyester of claim 3.
5. A fiber-forming copolyester according to claim 1 wherein X is hydrogen and R is methyl.
6. A fiber-forming copolyester according to claim 1 wherein X is hydrogen and R is hydrogen.
7. A fiber-forming copolyester according to claim 1 wherein X is methyl and R is hydrogen.
8. A filament of the copolyester of claim 5.
9. A filament of the copolyester of claim 6.
10. A fiber-forming copolyester according to claim 1 wherein X is hydrogen and R is chloro.
11. A fiber-forming copolyester according to claim 1 wherein X is methyl and R is methyl.
12. A fiber-forming copolyester according to claim 1 wherein X is chloro and R is chloro.
13. A filament of the copolyester of claim 10.
14. A filament of the copolyester of claim 11.
15. A filament of the copolyester of claim 12.

* * * * *